(No Model.) 6 Sheets—Sheet 2.
W. P. BETTENDORF.
PLOW AND PLANTER.
No. 329,123. Patented Oct. 27, 1885.
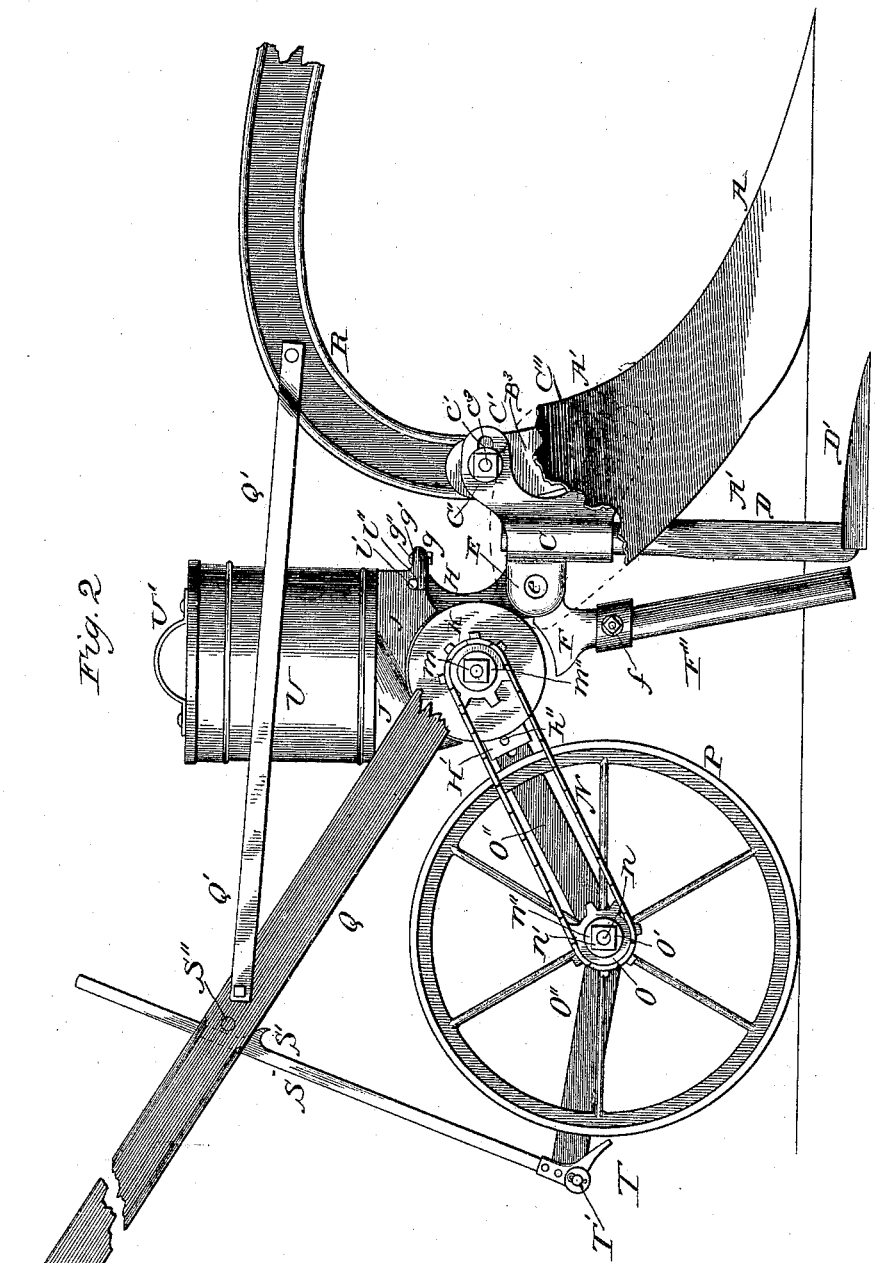
Witnesses:
G. L. Ayres
Albert H. Adams.
Inventor:
William P. Bettendorf.
By West & Bond.
His attys

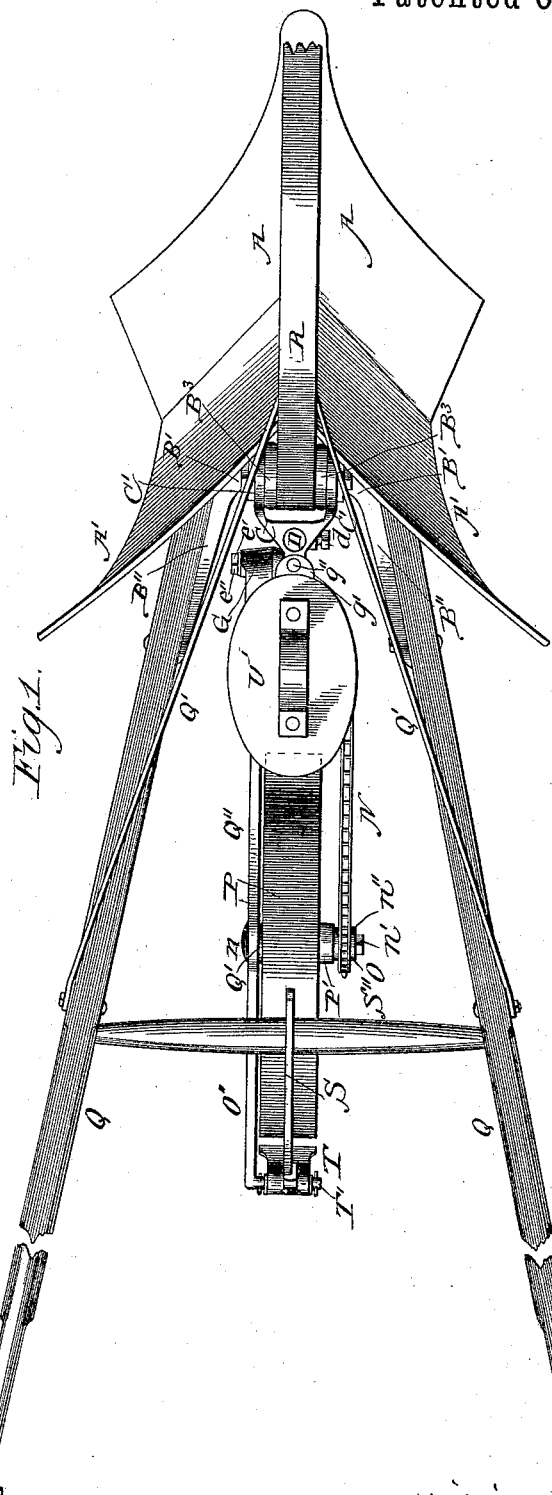

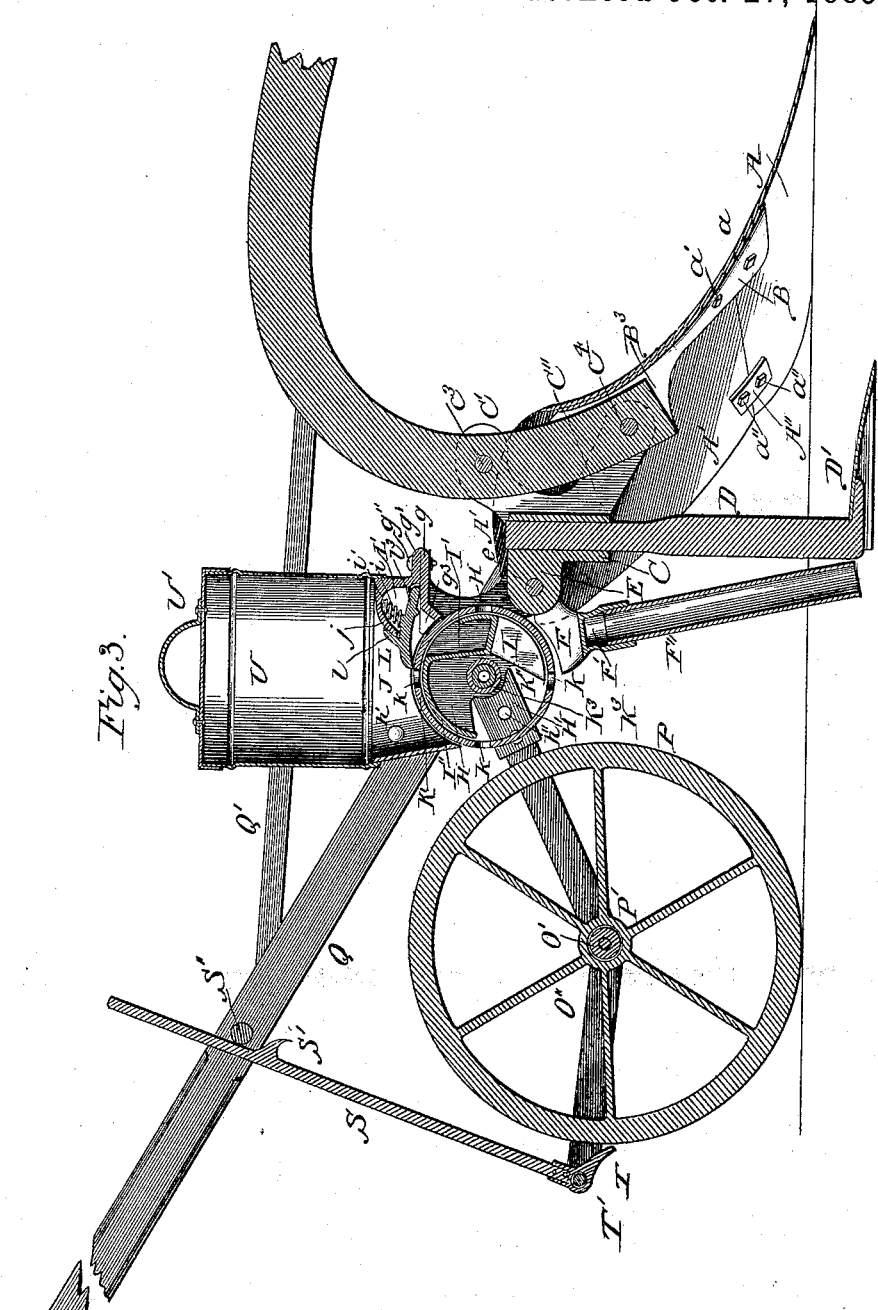

(No Model.)  6 Sheets—Sheet 4.
W. P. BETTENDORF.
PLOW AND PLANTER.
No. 329,123. Patented Oct. 27, 1885.
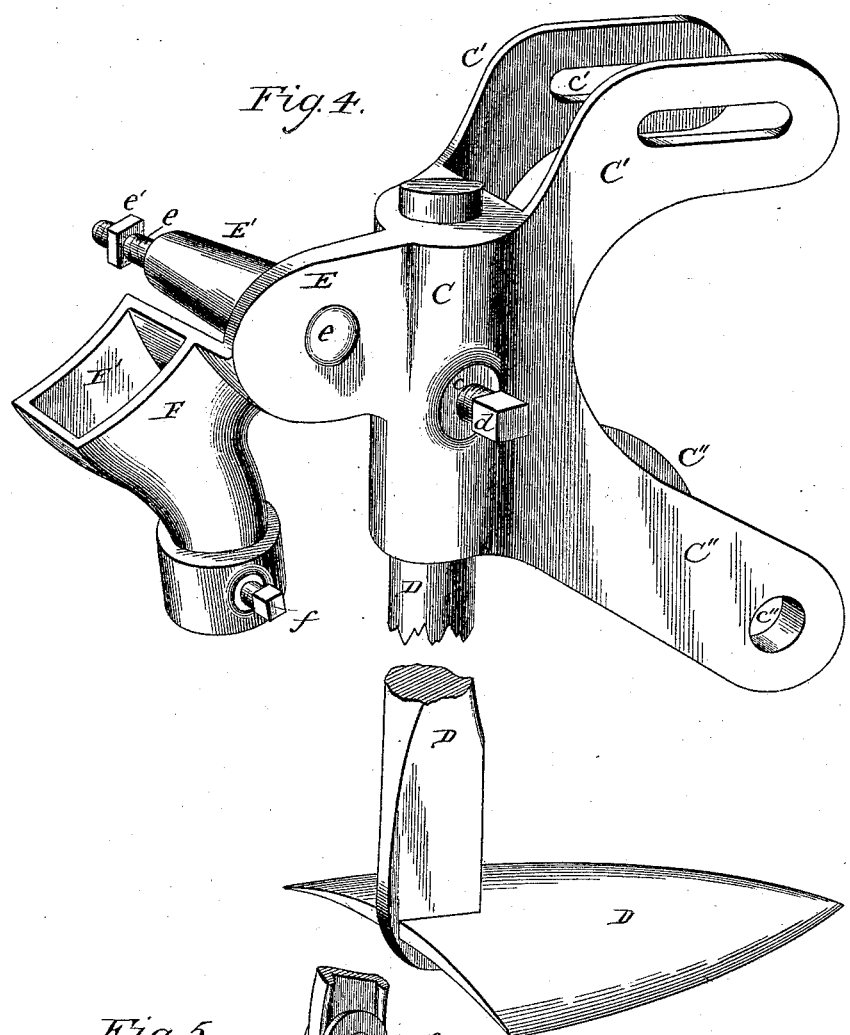
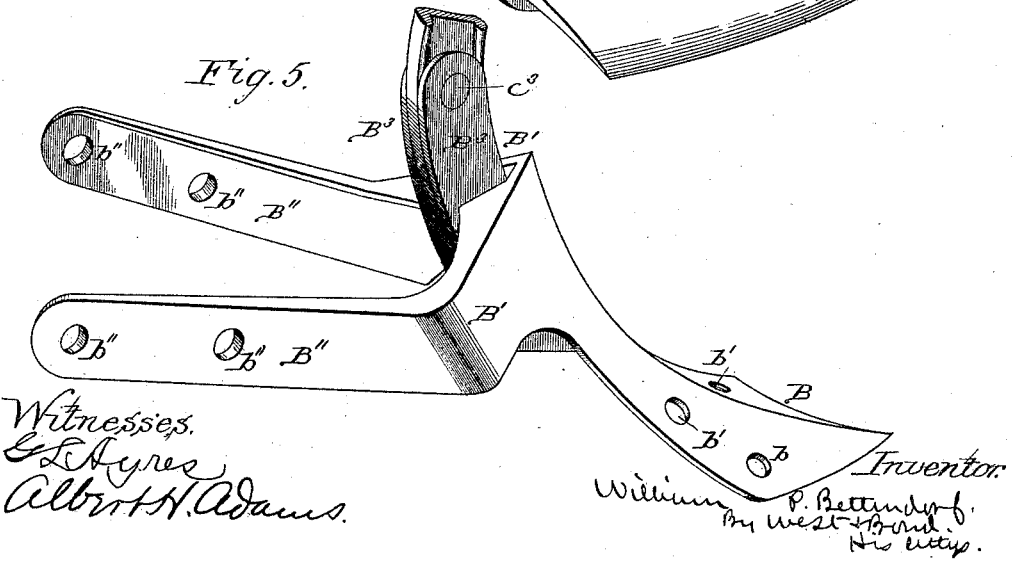
N. PETERS, Photo-Lithographer, Washington, D. C.

(No Model.)  
6 Sheets—Sheet 5.
W. P. BETTENDORF.
PLOW AND PLANTER.
No. 329,123. Patented Oct. 27, 1885.
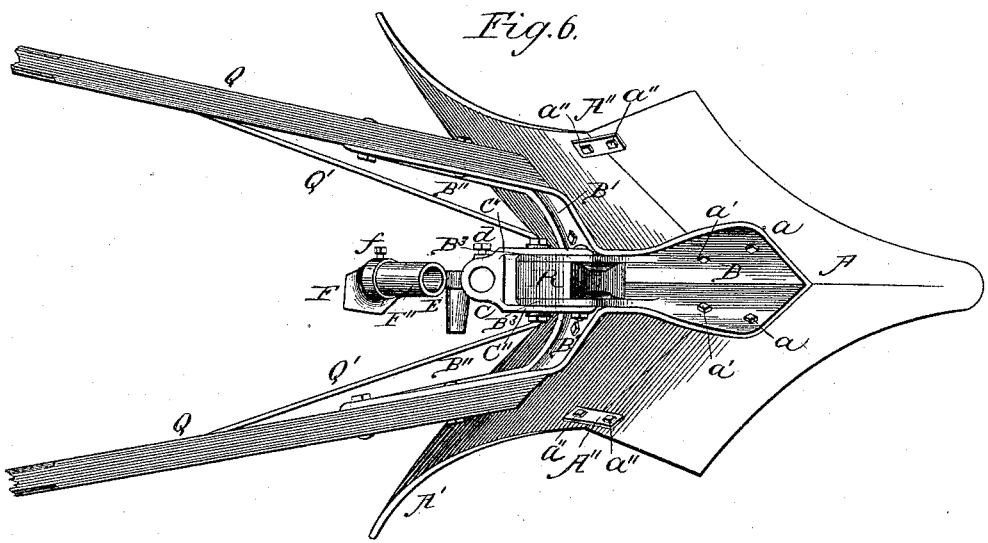
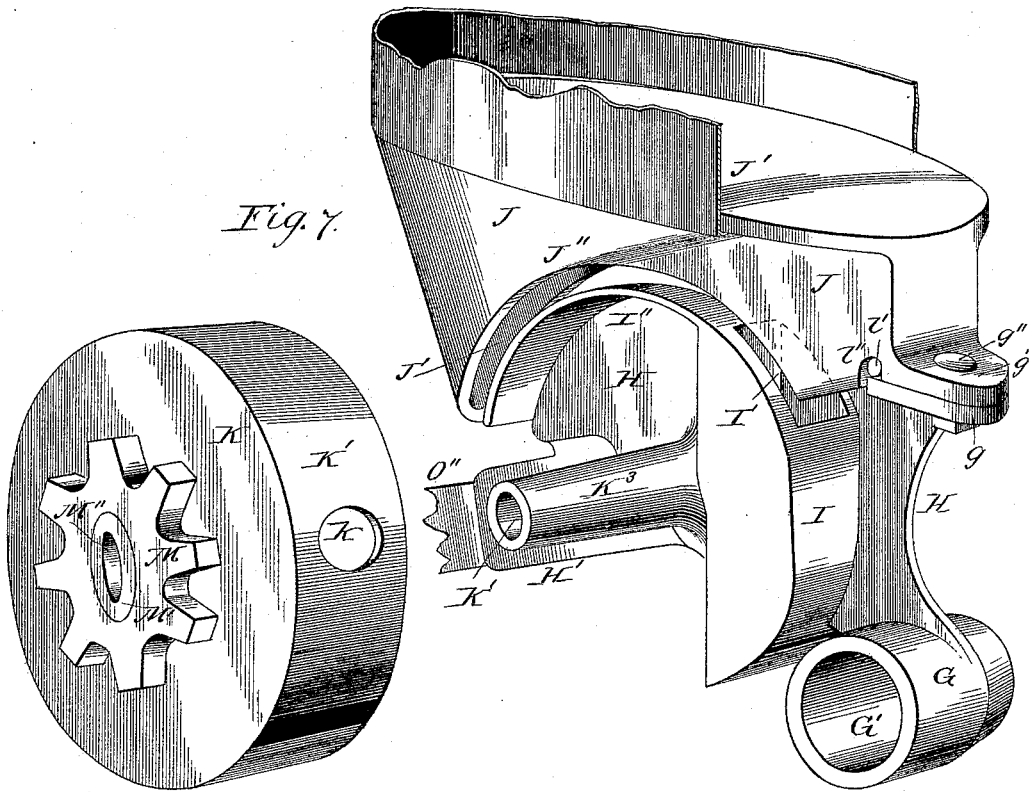
Witnesses.
Inventor:
William P. Bettendorf.
By West & Bond.
His attys.

(No Model.)  
W. P. BETTENDORF.  
PLOW AND PLANTER.  
6 Sheets—Sheet 6.
No. 329,123. Patented Oct. 27, 1885.
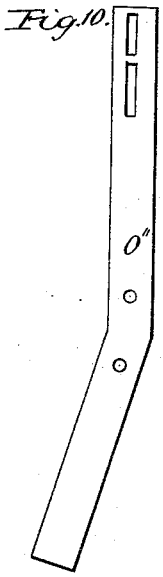
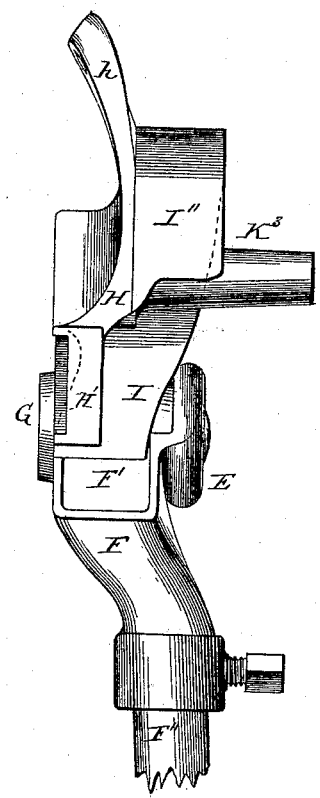
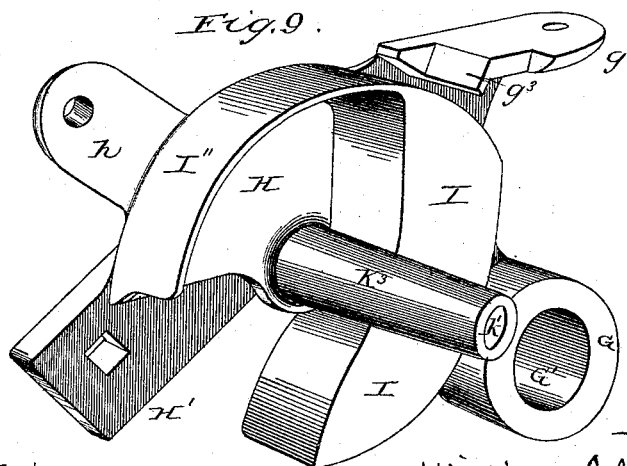

UNITED STATES PATENT OFFICE.

WILLIAM P. BETTENDORF, OF PERU, ILLINOIS, ASSIGNOR TO HIMSELF AND PERU CITY PLOW COMPANY, OF SAME PLACE.

PLOW AND PLANTER.

SPECIFICATION forming part of Letters Patent No. 329,123, dated October 27, 1885.

Application filed July 10, 1885. Serial No. 171,242. (No model.)

*To all whom it may concern:*

Be it known that I, WILLIAM P. BETTENDORF, residing at Peru, in the county of La Salle and State of Illinois, and a citizen of the United States, have invented certain new and useful Improvements in Plows and Planters, of which the following is a full description, reference being had to the accompanying drawings, in which—

Figure 1 is a top or plan view with the front end of the beam broken off and the handles broken; Fig. 2, a side elevation of the parts shown in Fig. 1, with the mold-board and handle broken away; Fig. 3, a vertical longitudinal section of Fig. 1; Fig. 4, a perspective view of the support for the subsoiler and dropping-tube, showing the standard of the subsoiler broken in two; Fig. 5, a perspective view of the frog, showing also the lower end of the beam; Fig. 6, a bottom view of the plow, its frog, and the support for the subsoiler and dropping-tube, showing also the lower end of the handles; Fig. 7, a perspective view of the dropping devices, showing the receptacle for the seed broken and partly in section; Fig. 8, a detail, being a rear elevation of the part shown; Fig. 9, a perspective view of the frame and spout of the dropping devices; Fig. 10, a detail of the reach.

The object of this invention is to improve the construction and operation of that class of combined seed-planters and plows in which a double-shovel plow is used, followed by a subsoiler, in connection with a seed-dropping mechanism carried by the plow; and its nature consists in the several parts and combinations of parts hereinafter described, and pointed out as new in the claims for attaining the objects sought.

In the drawings, A represents the point of a double mold-board plow having wings or mold-boards A' attached thereto by straps A" and bolts $a''$, or in any other suitable manner.

B is the main portion of a frog having an upper surface adapted to receive the point and wings, and to which the point and wings are secured by bolts $a$ $a'$, as shown in Fig. 6, the frog having holes $b$ $b'$ for the passage of the bolts. This frog on its upper surface has an apex with inclined faces on each side and curved from front to rear to properly receive and support the mold-board and wings, and an additional support for the wings is furnished by extensions B', against which the wings rest, and each extension B' is provided with a further extension or arm, B", to which the handles are secured by bolts or otherwise, as shown in Fig. 6, and between the extensions or heel B' at the center are plates B³, with a space between them to receive the lower end of the plow-beam and form an attachment of the frog and plow to the plow-beam.

C is a socket to receive the stem or shank of a subsoiler, and from this socket on its front face extend forward arms C' at the top and C" at the bottom, which arms are the required distance apart to receive the plates B³ between them, and at the required distance apart vertically to furnish a bracing support for the socket when the arms are attached to the plates B³ and the plow-beam, as shown in Figs. 2 and 3. The arms C' are each provided with a slot, $c'$, as shown in Fig. 4, and the arms C" are each provided with a hole, $c''$, and the socket C is attached to the plow-beam by passing a bolt, $c^3$, through the slots $c'$ in the arms and a hole in the plow-beam and the plates B³, and by passing a bolt, $c^4$, through the holes $c''$ in the arms C", and through a hole in the plow-beam and plates B³, as shown in Fig. 3. The slots $c'$ enable the socket to be adjusted forward or back and up and down, as required, to give the proper set thereto to receive the shank or stem of the subsoiler and hold the subsoiler properly in position.

D is the shank or stem of the subsoiler, the upper end of which enters the socket C and is locked therein in any required position by a set-screw or bolt, $d$, which passes through a screw-threaded opening, $c$, in the wall of the socket to have its end engage the face of the shank or stem, and this shank or stem D carries on its lower end a subsoiler, D', of any of the usual forms.

E is a fin formed with the socket C on its rear face and projecting backward, and having on one of its side faces a spindle, E', through which passes a bolt, $e$, having on its end a screw-thread to receive a nut, $e'$.

F is a socket having therein an opening, F', the upper portion of which is square in cross-section, and the lower portion round, the lower portion receiving the upper end of a dropping-tube, F''', which is locked in position by a set-screw or bolt, $f$, passing through a threaded opening in the wall of the socket to have its end engage the face of the tube, and this tube F''' extends down so as to discharge the seed onto the ground back of the subsoiler, and can be adjusted to drop higher or lower by adjusting it in the socket F.

G is a hub having a tapering opening, G', as shown in Fig. 7, to fit the spindle E', which hub, when slipped onto the spindle, is held in position by a washer, $e''$, and the nut $e'$ with the bolt $e$.

H is a fin or plate extending up and back from the hub G, and having on its exterior side face a plate or extension, H', to receive the reach or connecting-bar of the driving or ground wheel, the extension having holes $h''$ for the passage of bolts to secure the reach in place.

I is a receptacle formed on the inner wall or face of the fin or plate H, and having a curved periphery with an opening, I', which opening extends down through the receptacle, and this receptacle I does not run in a straight vertical line, but its lower portion is turned to bring the mouth of the opening I' directly over the mouth of the opening F' in the socket F, and from the rear edge of the opening I' backward extends a flange, I'', the periphery of which is on the arc of a circle corresponding to the periphery of the receptacle I.

J is a shell having an interior opening, J', with a lower edge, J'', struck on the arc of a circle corresponding to the circle of the receptacle I and flange I'', and this shell is located in such relation to the receptacle I and flange I'' as to leave a semicircular recess between the lower edge of the shell and the receptacle and flange, as shown in Fig. 7. At the upper forward end of the plate or fin H is an ear, $g$, and on the forward end of the shell J is a corresponding ear, $g'$, through which ears a bolt, $g''$, passes to attach the shell to the plate H at the forward edge, and the shell is attached at its rear edge by a bolt, $h'$, passing through the side wall of the shell, and an ear, $h$, extending up from the plate H.

K is a plate having its periphery provided with a flange or rim, K', in which is a series of holes, $k$. This rim has an interior diameter corresponding to the diameter of the circle of the periphery of the receptacle I and flange I', and enters in the opening between the shell J and the receptacle I and flange I'', and when in position its inner face rides over the exterior face of the flange I'' and receptacle I, and so that the holes $k$ will successively pass over the opening I', allowing the seed caught in the holes $k$ to drop into the opening and pass down to enter the socket-opening F', and pass into and out of the dropping-tube F'''. The plate K has an inwardly-projecting boss or hub, K'', with a tapering opening to receive a tapering spindle, K³, projecting out from the plate H, and this spindle has a central longitudinal opening, $k'$, for the passage of a bolt, by which the parts are secured in proper working position.

L is a cut-off or dog, the acting end of which, when the parts are together, comes back of the opening I' and rests on the rim K', so as to cut off the grain, except that carried in the openings $k$, successively. This dog L has on its upper face a flange, $l$, which lies over a flange, $j$, on the inner face of the shell J, the two flanges maintaining the dog in position and furnishing a guide and support for the dog, and just forward of this flange $l$, so as to lie beneath the flange $j$, is a pin, $i$, around which is a coiled spring, $i'$, by which the acting end of the dog is held down to its work, one end of the spring resting on the top of the dog and the other engaging the under face of the flange $j$. The pivoted end of this dog L has on each side trunnions $l'$, which enter recesses $l''$ formed in the walls of the shell J, as shown in Fig. 7. As shown, the under face of the dog L has a rib, $l^3$, and the inner end of the ear $g$, directly beneath the rib, has an inclined face, $g^3$, (shown in Fig. 3,) by means of which the turning of the seed into the opening I' is insured, as the rib $l^3$ and inclined face $g^3$ form a stop against which the seed in the hole $k$ will come in contact, as the plate K revolves, and force the seed out of the hole.

M is a sprocket-wheel firmly secured to a hub, M', on the outer face of the plate K at the center, and this hub has a hole, M'', which, when the parts are together, forms a continuation of the hole $k'$, and through which and the hole $k'$ the stem of a bolt, $m$, passes, and the parts are locked together by the nut $m'$ of the bolt $m$ and an anti-friction washer, $m''$, between the nut and the hub M', so as to leave the wheel formed by the plate K and rim K' free to revolve.

N is a sprocket-chain running over the sprocket-wheel M and a sprocket-wheel driven from the ground-wheel.

O is the sprocket-wheel driven from the ground-wheel, mounted on the end of a spindle, O', which spindle also forms the axis of the ground-wheel, and extends out from the reach O'', by which the ground-wheel is attached to the frame or plate carrying the dropping devices, the attachment at the forward end being by bolts $h''$, which pass through the extension H' and the reach, and as the plate or frame H is pivotally connected by its hub G to the socket-support C, through the fin E and spindle E', it will be seen that the dropping devices, reach, and ground-wheel can be raised and lowered, as required, to be out of or in use.

P is the ground-wheel having a hub, P', mounted on the spindle O', and to this hub is firmly connected the sprocket-wheel O by suitable recesses in the end of the hub and flanges on the end of the hub of the wheel, or in any other suitable manner, so that as the ground-wheel turns rotation will be imparted to the sprocket-wheel O to drive the chain N and sprocket-wheel M, and rotate the seed-wheel K K'.

Q are the handles, the forward ends of which are attached by bolts to the extensions B'' of the heel of the frog B, and, as shown, the handles are braced by bars Q', running from each handle to the plow-beam.

R is the plow-beam having its rear end curved and entering the opening between the plates B³, to be there secured by the bolts $c^3$ $c^4$, as before described.

S is a lifting and hang-up rod, by which the wheel P can be raised and held in an elevated position when the plow is out of use. This bar, near its upper end at the proper point to hold the wheel elevated, is provided with a hook, S', to pass over a cross-rod, S'', running from handle to handle, so that the wheel, when the hook is engaged with the cross-rod, will be held suspended.

T is a scraper socketed or otherwise secured to the lower end of the bar S, and arranged to engage with the rim of the wheel P to keep it clear of dirt, and, as shown, this scraper is pivoted to a pin, T', on the rear end of the reach or bar O'', which is extended back for that purpose, by which means the rod S is also pivoted, so that its hook S' can be made to engage with or be disengaged from the cross-bar S''.

U is a receptacle, made of sheet metal or other suitable material, secured to the shell J, and having, as shown, a cover, U', which receptacle receives the seed to be dropped. The point A and wings A' are attached to the frog B by the bolts $a$ $a'$, and are braced together by the straps A''. The rear end of the plow-beam is passed between the plates B³, and the arms C' C'' of the socket C are passed outside of the plates B³ to bring the hole $c''$ in the arms C'', and the slots $c'$ in the arms C' in proper relation with the bolt-holes in the plates B³ and beam end for the passage of the bolts $c^3$ $c^4$ to secure the beam end to the plates B³, and the socket C to these same plates by the same bolts $c^3$ $c^4$. The shank or stem D of the subsoiler is slipped into the socket C, and adjusted properly and locked when adjusted by the set-screw or bolt $d$. The spout F'' is slipped into the socket F, and adjusted and locked by the set-screw or bolt $f$. The hub G is slipped onto the trunnion E', and secured in place by the bolt $e$, nut $e'$, and washer $e''$, connecting the plate or frame H with the socket C in a pivotal manner. The shell J is attached to the plate or frame H by passing the bolt $g''$ through the ears $g$ $g'$, and passing the bolt $h'$ through the wall of the shell and the ear $h$, and screwing down the nuts of the respective bolts $g''$ $h'$, the shell having thereon the receptacle U. The dropping-wheel formed by the plate K and rim K' has its hub K'' slipped onto the spindle K³, passing the flange K' into the opening therefor between the shell J and the flange I'' and receptacle I, the sprocket-wheel M being firmly secured to its hub M' on the plate K, and the dropping-wheel as a whole is then secured in position by the bolt $m$, nut $m'$, and washer $m''$, the bolt passing through the hole $k'$ in the spindle K³ and the hole M'' in the hub M', and, as shown, this bolt $m$ forms one of the bolts for attaching the reach to the plate or frame H through the extension H', the reach being further secured by the bolt $h''$ passing through the extension H' and the reach. The wheel P has its hub P' slipped onto the trunnion or spindle O', and the sprocket-wheel O is slipped onto the spindle O' and connected with the hub P' of the wheel P, the chain being passed around the sprocket-wheels M O, and the wheel P with the sprocket-wheel O is held on the spindle O' by the bolt $n$, nut $n'$, and washer $n''$, the bolt passing through the hole in the spindle O'. The scraper T, with the bar S attached thereto, is slipped onto the pin T' and secured by a spring-key or otherwise, and the handles Q are secured at their forward ends to the extensions B'' and braced by the bars Q', attached at their forward ends to the plow-beam, and it will be seen that the several parts are readily and quickly put together, and when together the dropping devices and the subsoiler are carried from the plow frog and beam, and at the same time a loose connection is provided between the dropping devices and the attachment to the plow, by which the dropping devices are free to rise and fall without straining the parts and causing breakage in running over uneven ground.

In use the ground-wheel P is allowed to run on the surface of the ground and through its travel drive the sprocket-wheel O, which drives the chain N and sprocket-wheel M, rotating the seed-wheel K K', bringing the holes $k$ thereof successively under the cut-off or dog L, for the seed caught in each hole to pass beneath the cut-off or dog, and drop into the opening I' and enter the opening F', to pass down and through the dropping-spout F'' back of the subsoiler, to be covered by the earth, so that the act of plowing also drops and covers the seed, and when not in use—as in moving the plow from place to place, or from field to field—the ground-wheel P is raised and held in a suspended position by the bar S, preventing its contact with the ground and stopping the operation of the seed-dropping devices.

What I claim as new, and desire to secure by Letters Patent, is—

1. The frog B, having the extensions B' B'', and attaching-plates B³, for the attachment of a double-shovel plow, plow-beam, and handles, substantially as specified.

2. A double-shovel plow, A A', and frog B, having extensions B' B'' and plates B³, in combination with a plow beam and handles, substantially as and for the purpose specified.

3. The socket C, having arms C' C'', in combination with a frog, B, having plates B³, for attaching a subsoiler in position, substantially as specified.

4. The socket C, having arms C' C'', and fin E, with spindle E', in combination with a frog, B, having plates B³, for attaching a subsoiler and a seed-dropping mechanism, substantially as specified.

5. The plate H, formed integral with the receptacle I, having the passage I' and the laterally-projecting flange I'', in combination with the dropping-wheel K K', substantially as described.

6. The spindle K³, formed integral with the plate H, receptacle I, and lateral flange I'', said receptacle having the passage I', in combination with the dropping-wheel K K', having the hub K'', substantially as described.

7. The plate H, formed integral with the flange I'', and the receptacle I, having the passage I', in combination with the dropping-wheel K K', the cut-off dog L, mounted on the shell with its acting end located back of the passage in the receptacle and resting on the part K' of the dropping-wheel, the sprocket-wheels M O, chain N, and ground-wheel P, substantially as described.

8. The plate H, provided with the flange I'', receptacle I, and rearward extension H', in combination with the ground-wheel P, the spindle O', and the reach O'', carrying said spindle and secured at its upper and forward end to the rearward extension of the said plate, substantially as described.

9. The plate H, having the rearward extension H', in combination with the ground-wheel P, the spindle O', the reach carrying the spindle and secured at its forward end to the said extension and extending rearward back of the ground-wheel, and the bar S, mounted on the rear extension of the reach for hanging up the ground-wheel, substantially as described.

10. The socket C, having a fin or lug, E, in combination with the plate H, pivoted to said fin or lug and carrying seed-dropping mechanism, and the dropping-tube F'', carried by the fin or lug of the socket, substantially as described.

WILLIAM P. BETTENDORF.

Witnesses:
A. L. SHEPHERD,
H. BELLINGHAUSEN.